United States Patent [19]

Carow et al.

[11] Patent Number: 5,115,836

[45] Date of Patent: May 26, 1992

[54] BREAKAWAY HOSE COUPLING WITH INTEGRATED SWIVEL MECHANISM

[75] Inventors: Walter M. Carow; Alton Richards; Jerry L. Cox, all of Roane County, Tenn.

[73] Assignee: Richards Industries, Rockwood, Tenn.

[21] Appl. No.: 642,857

[22] Filed: Jan. 15, 1991

[51] Int. Cl.⁵ .............................................. F16L 29/00
[52] U.S. Cl. .................................. 137/614.04; 285/276
[58] Field of Search ................ 137/614.04, 614, 68.1; 285/276, 281, 181, 317, 318

[56] References Cited

U.S. PATENT DOCUMENTS

| | | | |
|---|---|---|---|
| 2,388,841 | 11/1945 | Goodwin | 285/276 |
| 2,397,265 | 3/1946 | Jacobsson et al. | 284/17 |
| 2,939,728 | 6/1960 | Bitel | 285/318 X |
| 3,097,867 | 7/1963 | Saloum | 285/86 |
| 3,211,178 | 10/1965 | Kiszko | 137/614.04 |
| 3,435,848 | 4/1969 | Johnston | 137/614.04 |
| 4,402,533 | 9/1983 | Ortloff | 285/18 |
| 4,611,834 | 9/1986 | Rabinovich | 285/276 X |
| 4,691,941 | 9/1987 | Rabushka et al. | 285/1 |
| 4,779,638 | 10/1988 | Nitzberg et al. | 137/68.1 |
| 4,791,961 | 12/1988 | Nitzberg et al. | 137/614.04 |
| 4,800,913 | 1/1989 | Nitzberg et al. | 137/68.1 |
| 4,827,960 | 5/1989 | Nitzberg et al. | 137/68.1 |
| 4,827,961 | 5/1989 | Nitzberg et al. | 137/68.1 |
| 4,828,183 | 5/1989 | Fink | 137/68.1 |
| 4,905,733 | 3/1990 | Carow | 137/614.04 |
| 5,018,546 | 5/1991 | Carmack et al. | 137/614.04 X |

FOREIGN PATENT DOCUMENTS 1088640 10/1967 France .............................. 285/316
491000 2/1976 U.S.S.R. .

Primary Examiner—Martin P. Schwadron
Assistant Examiner—Kevin L. Lee
Attorney, Agent, or Firm—Pitts and Brittian

[57] ABSTRACT

A breakaway hose coupling with an integrated swivel mechanism for releasably joining two fluid dispensing devices, and for selectively disengaging such dispensing devices in response to a disengaging force in excess of a preselected value being exerted on said coupling device. The coupling (10) comprises a first valve assembly (12) for being secured on a first dispensing device and for selectively terminating the flow of fluid from such dispensing device when the coupling (10) is uncoupled. The coupling (10) further comprises a second valve assembly (14) with an integrated swivel mechanism (80) for being secured on a second dispensing device and for selectively terminating the flow of fuel from the second dispensing device when the coupling (10) is uncoupled. The coupling (10) also includes automatic disconnect means for maintaining the first and second valve assemblies (12 and 14) in an engaged position in the absence of disengaging force in excess of a preselected value being applied to the coupling, and for disengaging the first and second valve assemblies in response to disengaging force in excess of said preselected value being applied to the coupling, whereupon the first and second valve assemblies (12 and 14) terminate the flow of fluid from their operatively associated dispensing devices.

19 Claims, 5 Drawing Sheets

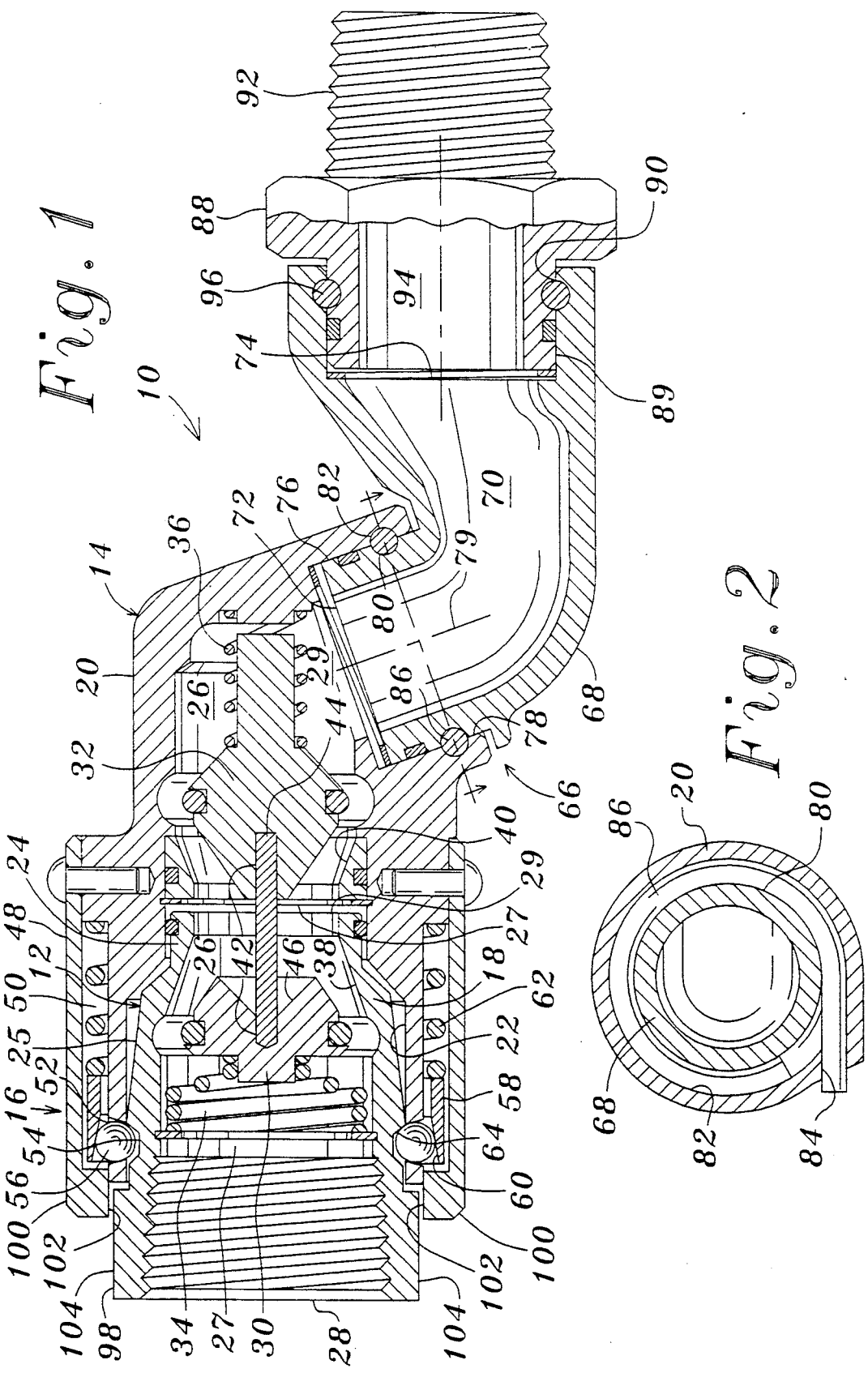

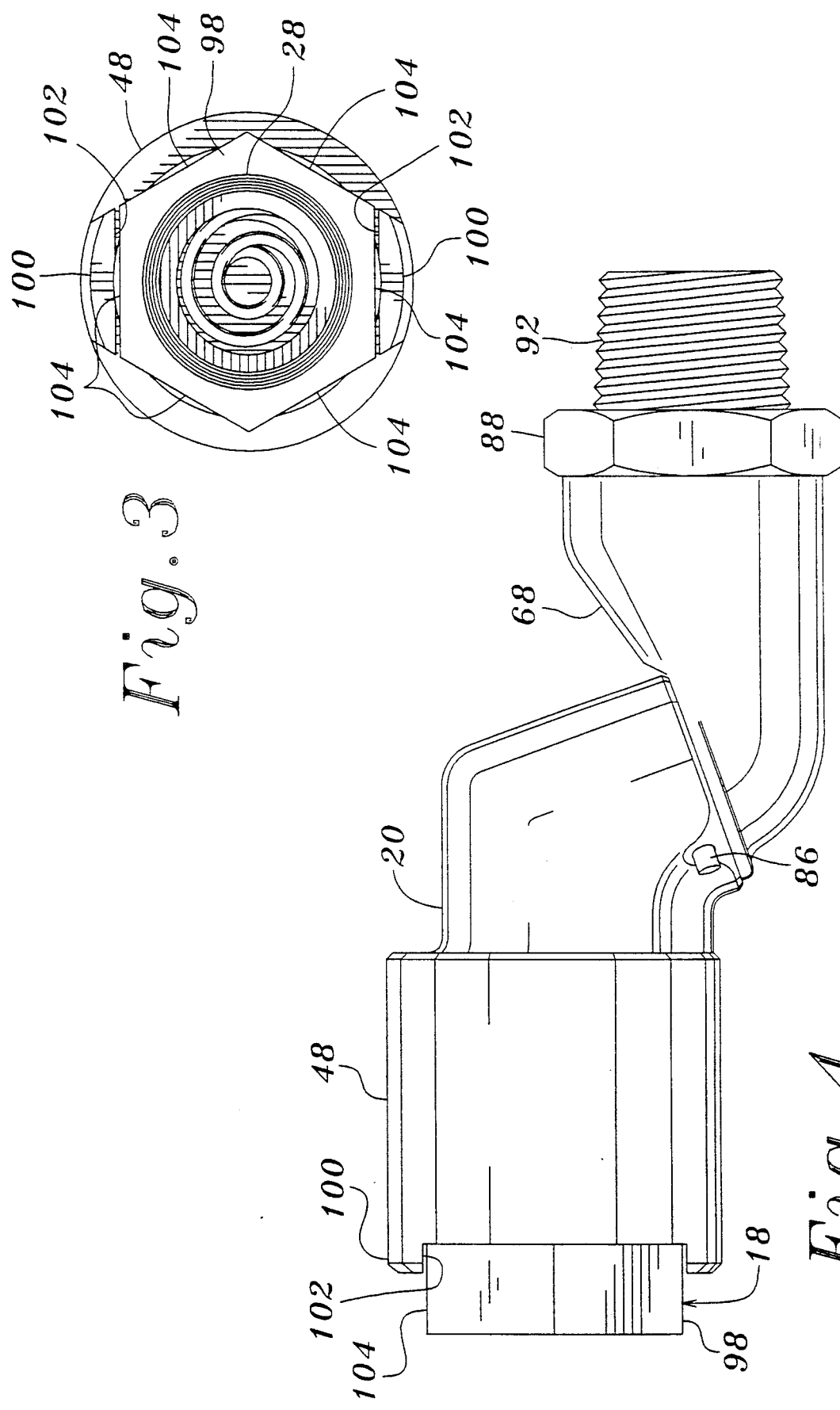

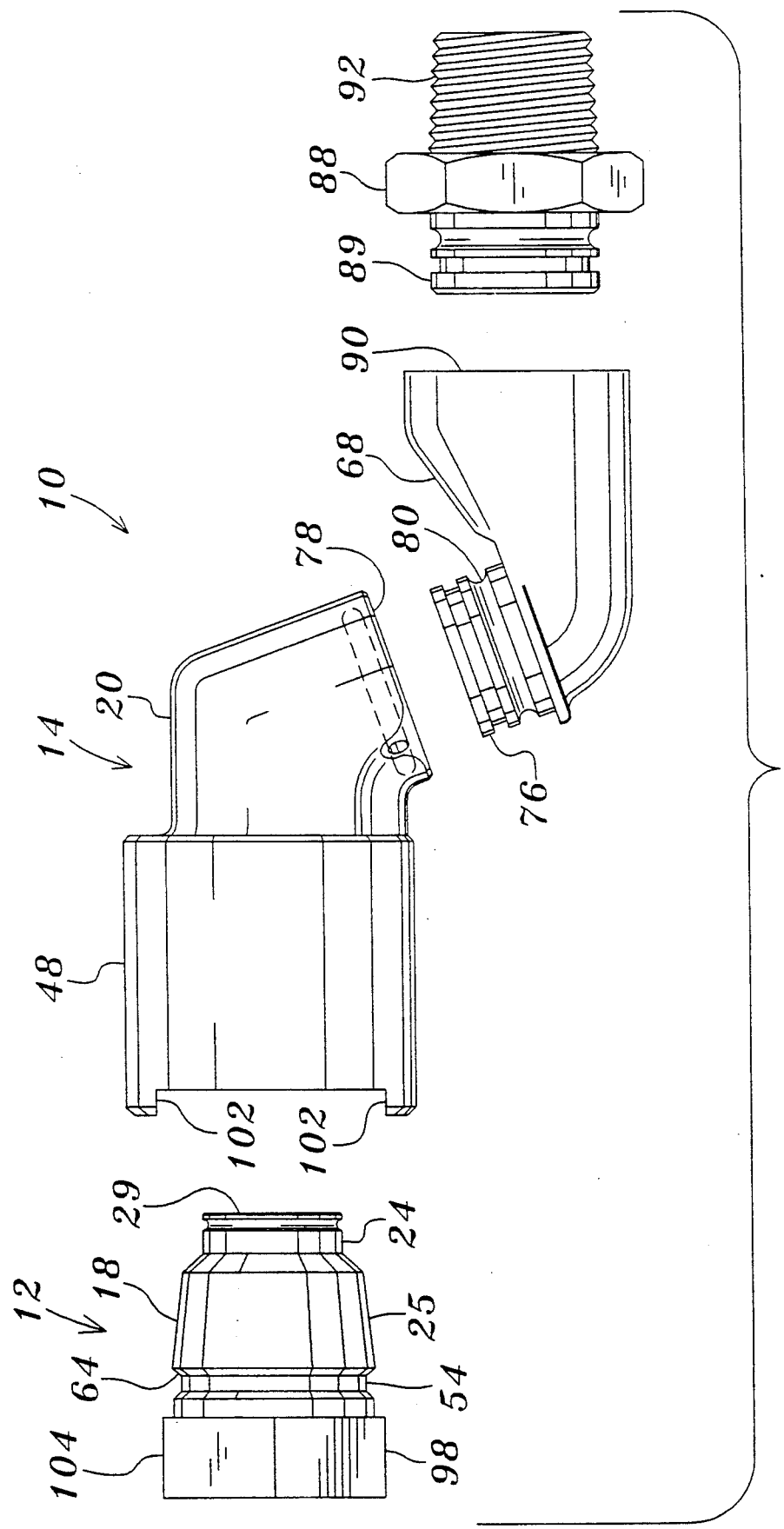

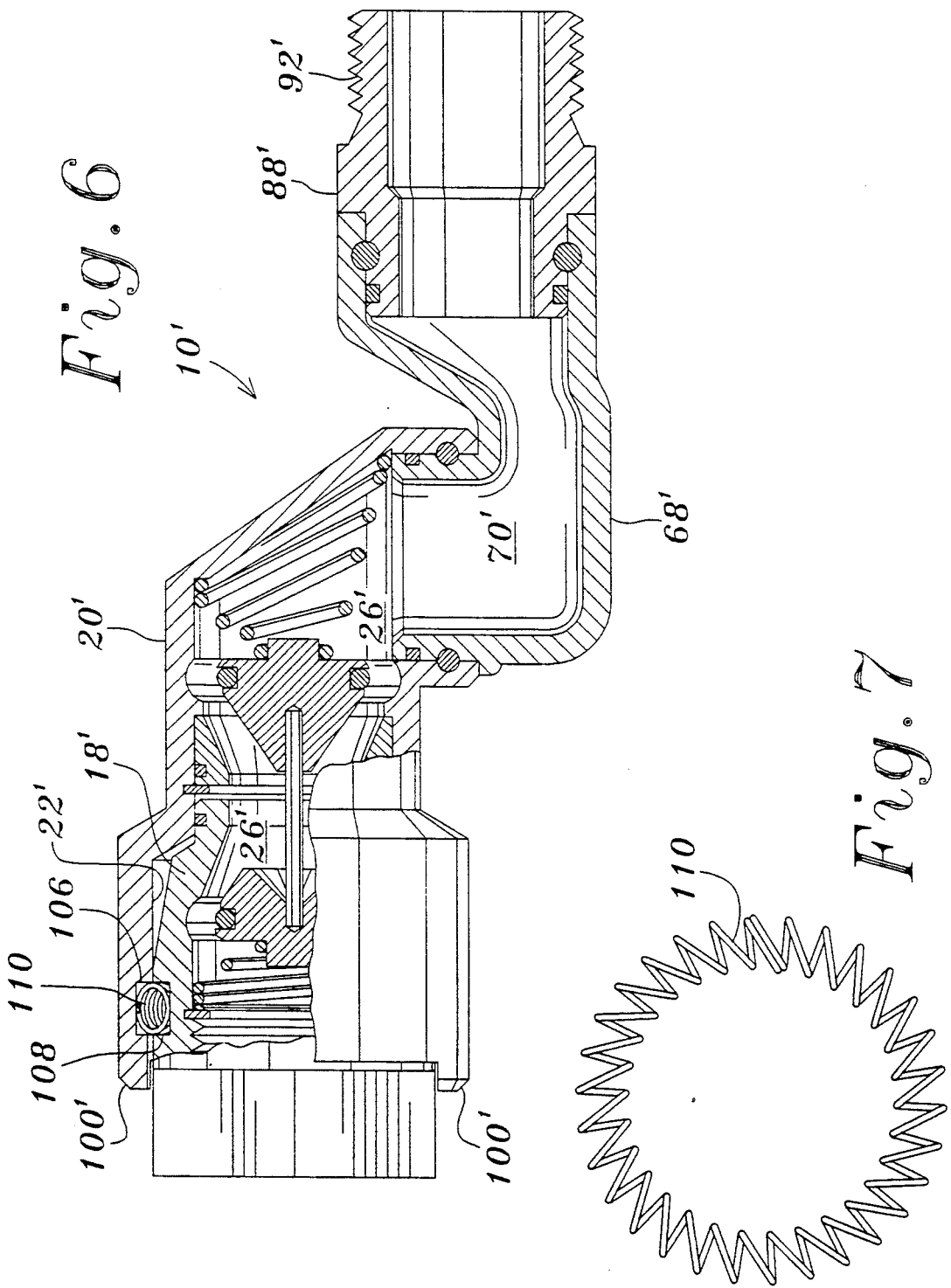

BREAKAWAY HOSE COUPLING WITH INTEGRATED SWIVEL MECHANISM

DESCRIPTION

1. Technical Field

This invention relates to an improved breakaway hose coupling for releasably joining two fluid dispensing devices, such as two fluid communicating hoses or a fluid communicating hose and a dispensing nozzle or pump, and for selectively disengaging such dispensing devices in response to a disengaging force in excess of a preselected value being exerted on the coupling. In this particular invention the coupling includes an integrated swivel mechanism which allows the joined dispensing devices to pivot with respect to one another on two different preselected axes.

2. Background Art

Filling stations for dispensing gasoline and other fuels have long had a problem with vehicles pulling away from fuel dispensing pumps with the dispensing nozzle still inserted in the vehicle's tank, or with the nozzle or dispensing hose otherwise secured or hung on the vehicle. Such incidences usually result in damage to the dispensing pump and/or breakage of the dispensing hose. It will be appreciated that repairing the resulting damage to the dispensing pump or hose can be very costly. Further, the fuel spillage which can result from such damage can create a dangerous and possibly life threatening condition. Attempts have been made to overcome this problem by installing two hoses joined by a breakaway hose coupling device between the dispensing pump and nozzle, with the coupling device being designed to disengage and seal the hose ends when pressure is exerted on the coupling as in the case where a vehicle pulls away from the pump with the nozzle or hose still attached. Certain devices of this type are disclosed in U.S. Pat. Nos. 4,905,733; 4,691,941; 4,402,533; 3,435,848; 3,211,178; 3,097,867; and 2,397,265. Such devices are also disclosed in U.S.S.R. Patent No. 491000 and British Patent No. 1088640. However, such coupling devices are generally rigid structures which inhibit the mobility of the dispensing nozzle.

Also, heretofore, swivel couplings have been placed between dispensing hoses, or between the hose and the dispensing pump or nozzle to increase the mobility of the dispensing nozzle. Such swivel couplings allow the dispensing nozzle to pivot on an axis perpendicular or inclined with respect to the axis of the hose to which it is secured. However, this requires the installation of a separate device between the dispensing pump and dispensing nozzle. Attempts have been made to incorporate a swivel mechanism into a breakaway hose coupling, but the swivel mechanism tends to disrupt the proper operation of the breakaway mechanisms often causing the coupling either to fail to disconnect or to fail to properly seal the hose ends or dispensing device. Examples of attempts to incorporate a swivel mechanism into a breakaway coupling are disclosed in U.S. Pat. Nos. 4,800,913; 4,791,961; and 4,779,638.

Therefore, it is an object of the present invention to provide a breakaway hose coupling for joining two fuel dispensing devices which incorporates a swivel mechanism.

It is another object of the present invention to provide a breakaway hose coupling which disengages and terminates the flow of fluid from such dispensing devices in response to a disengaging force in excess of a preselected value being exerted on the coupling device, and which has an integrated swivel mechanism which does not disrupt the disengaging of the coupling device or the proper termination of the fluid flow from the dispensing devices.

Yet another object of the present invention is to provide a breakaway hose coupling with an integrated swivel mechanism which is light, compact and inexpensive to manufacture and maintain.

DISCLOSURE OF THE INVENTION

Other objects and advantages will be accomplished by the present invention which provides a breakaway hose coupling device with an integrated swivel mechanism. The coupling device is designed for releasably joining two fuel dispensing devices, e.g. joining two fuel dispensing hoses, or joining a dispensing hose to a dispensing pump or nozzle, and for selectively disengaging such dispensing devices in response to a disengaging force in excess of a preselected value being exerted on the coupling device.

The coupling device comprises a first valve assembly for being secured on a first dispensing device and for selectively terminating the flow of fuel from such dispensing device. The first valve assembly includes a first valve housing provided with a first passageway therethrough, the passageway defining a first port for being placed in fluid communication with the first dispensing device. The first valve assembly also includes a first valve means mounted within the first valve housing for selectively terminating the flow of fuel through the first passageway. The breakaway coupling further comprises a second valve assembly with an integrated swivel mechanism for being secured on a second dispensing device and for selectively terminating the flow of fuel from the second dispensing device. The second valve assembly includes a second valve housing for releasably engaging the first valve housing, the second valve housing being provided with a second passageway therethrough defining a first port for being placed in fluid communication with a second port defined by the first passageway of the first valve housing. The second valve assembly also includes an elbow for pivotally engaging the second valve housing and for engaging the second dispensing device. The elbow is provided with a third passageway therethrough defining a first port for communicating with a second port defined by the second passageway of the second valve housing and defining a second port for being placed in fluid communication with the second dispensing device.

A swivel connecting means is provided for pivotally securing the elbow to the second valve housing, whereby the elbow pivots with respect to the second valve housing about a second rotational axis inclined with respect to the axial alignment of the valve means of the first valve assembly. The second valve assembly further includes a second valve means disposed in the second valve housing at a location remote from the swivel connecting means for selectively terminating the flow of fuel through the second passageway.

The breakaway coupling also includes automatic disconnect means for maintaining the first and second valve housings in an engaged position in absence of disengaging force in excess of a preselected value, and for disengaging the first and second valve housings in response to disengaging force in excess of said preselected value, whereby the first and second valve means terminate the flow of fuel through the first and second passageways, respectively upon the disengaging of the first and second valve housings. Also, means are provided for prohibiting the rotation of the first valve housing with respect to the second valve housing.

BRIEF DESCRIPTION OF THE DRAWINGS

The above-mentioned features of the present invention will become more clearly understood from the following detailed description of the invention read together with the drawings in which:

FIG. 1 illustrates a side elevation view, in section, of a breakaway coupling of the present invention.

FIG. 2 illustrates a partial top view, in section, of a breakaway coupling of the present invention.

FIG. 3 illustrates a partial end view of a breakaway coupling of the present invention.

FIG. 4 illustrates a side elevation view of a breakaway coupling of the present invention.

FIG. 5 illustrates an exploded side elevation view of a breakaway coupling of the present invention.

FIG. 6 illustrates a side elevation view, partially in section, of an alternate embodiment of the breakaway coupling of the present invention.

FIG. 7 illustrates a front view of a canted-coil spring of the breakaway coupling of FIG. 6.

BEST MODE FOR CARRYING TO THE INVENTION

Figure 1A:
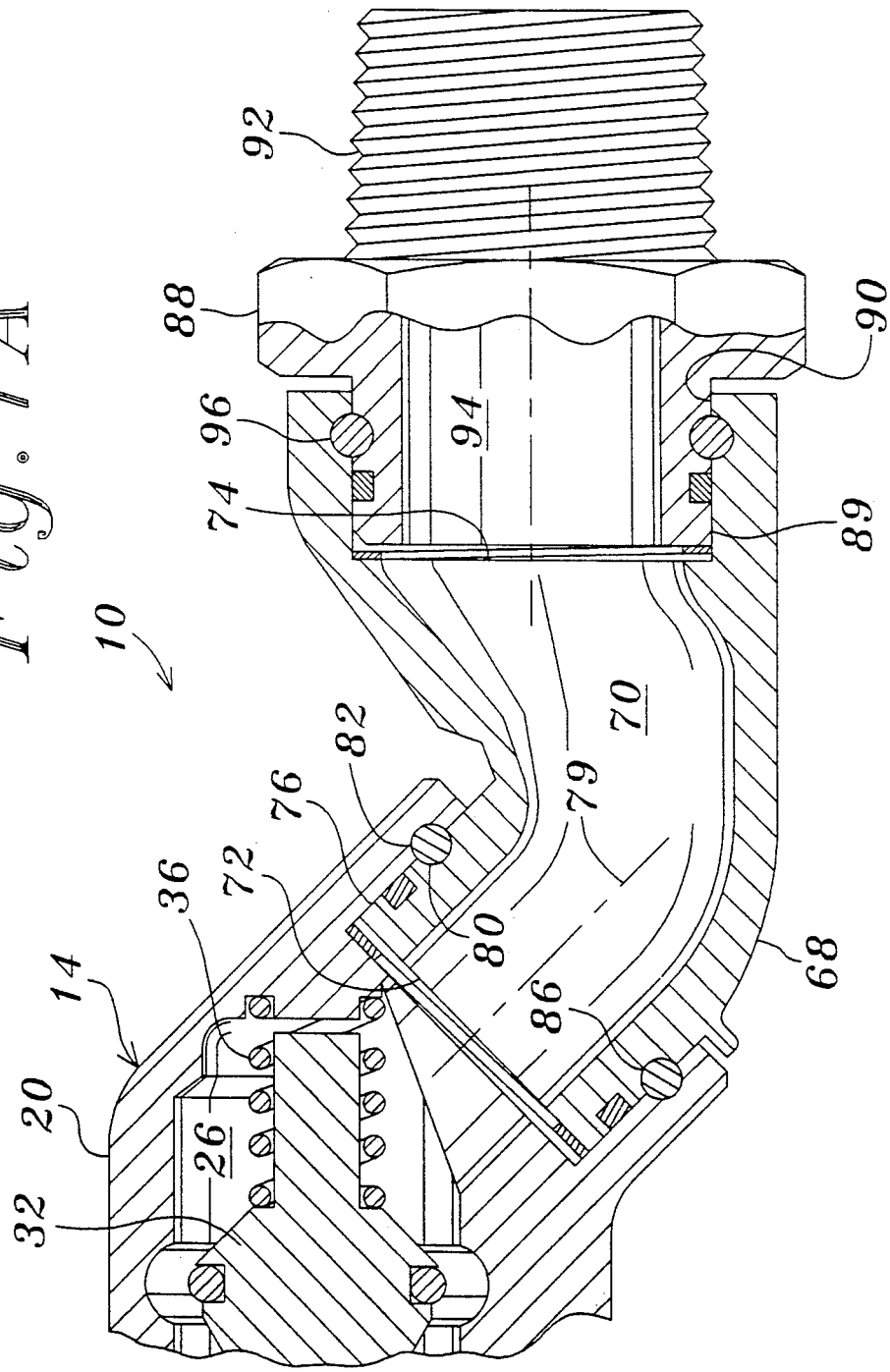
FIG. 1A illustrates a partial side elevation view, in section, of an alternate embodiment of the breakaway coupling of the present invention.

A breakaway hose coupling incorporating various features of the present invention is illustrated generally at 10 in FIG. 1. The coupling 10 is designed to accomplish the fluid-tight coupling of two fluid dispensing devices, such as two fluid communicating hoses, or a fluid communicating hose and a fluid dispensing pump or nozzle. The coupling is designed to breakaway or disengage upon separation force in excess of a preselected value being applied against the coupling and to terminate the flow of fluid from the dispensing devices to which the coupling is engaged. Whereas, the device 10 will be discussed at times herein in terms of joining two fuel dispensing hoses, or joining a fuel dispensing hose to a fuel dispensing pump or nozzle, it will be appreciated that the device can be used in conjunction with various types of liquid dispensing devices carrying various types of fluids.

The breakaway hose coupling 10 generally comprises first and second valve assemblies 12 and 14, respectively, and disconnect means 16 for releasably joining the valve assemblies 12 and 14 in the absence of axial disengaging force in excess of a preselected value and for releasing at least one of the valve assemblies 12 or 14 in response to axial disengaging force in excess of a preselected value. As is best illustrated in FIG. 1, the first and second valve assemblies 12 and 14 comprise first and second valve housings 18 and 20, respectively, with the valve housing 20 defining a forwardly disposed receptor 22 for slidably receiving the forward portion 24 of the valve housing 18. Each of the valve housings 18 and 20 is provided with a passageway 26 therethrough, with each passageway 26 defining a first port 27 and a second port 29 accessing the passageway. The passageways 26 are disposed with respect to the operatively associated valve housing such that, as the forward end portion of the housing 18 is received in the receptor 22, the passageways 26 of the housings 18 and 20 are aligned to establish fluid communication between the housings. Further, the rearward portion of the housing 18 is provided with releasable connecting means, such as the threaded receptor 28, for releasably engaging a hose end or directly engaging a nozzle, pump, or other dispensing device so as to place such device in fluid communication with the first port 27 of the passageway 26.

In order to automatically seal the passageways 26 when the valve housings 18 and 20 disconnect, each of the valve assemblies is provided with a valve means disposed within the operatively associated passageway 26. In the preferred embodiment, such valve means includes the poppet valves 30 and 32 which are axially mounted in the passageways 26 of the housings 18 and 20, respectively. Also provided are the spring members 34 and 36 which serve both as a means for mounting the poppet valves and as a means for biasing the poppet valves 30 and 32 toward the valve seats 38 and 40, respectively, defined by the walls of the passageways 26.

Each of the poppet valves 30 and 32 is provided with a forwardly disposed pin receptor 42 which is releasably receptive of an opposite end portion of the alignment pin 44. As illustrated in FIG. 1, when the valve housings 18 and 20 are in an engaged position the alignment pin 44 serves to hold the poppet valves in an axially aligned, open position against the bias of the springs 34 and 36. However, when the housings 18 and 20 disengage and separate the pin 44 slides from the receptor 42 of the poppet valve 30 allowing the poppet valves 30 and 32 to seat against the valve seats 38 and 40, respectively. Resultantly, the passageways 26 are sealed and the flow of fluid from the dispensing devices to which the valve housings are secured is terminated.

With respect to the alignment pin 44, it will be understood that the pin can be secured to, or integral with, one of the poppet valves 30 or 32 if desired. Further, one or both of the pin receptors 42 can be provided with a conical mouth 46 to facilitate the insertion of the pin 44 in the receptor 42 when the forward portion 24 of the housing 18 is being inserted into the receptor 22 of the housing 20.

As indicated above, the disconnect means 16 serves as a means for automatically disconnecting the housings 18 and 20 when axial disengaging force in excess of a preselected value is applied to the coupling 10. In the preferred embodiment the disconnect means 16 includes an annular disconnect housing defined by the exterior of the housing 20 and an outer sleeve 48 such that the disconnect housing defines a latch cavity 50 circumscribing the housing 20. A ball latch mechanism is housed within the latch cavity 50 which serve to releasably lock the housing 18 in the receptor 22. In this regard, a plurality of latch ball openings 52 are provided in the housing 20 which register with an annular recess 54 provided in the housing 18 as the housing 18 is received in the receptor 22. Each of the latch ball openings is receptive of a latch ball 56. As illustrated in FIG. 1, when the latch mechanism is in a locked position the latch balls 56 protrude into the receptor 22 and releasably seat in the annular recess 54, and, thus, prohibit the housing 18 from disengaging from the receptor 22.

The ball latch mechanism also includes a locking means for locking the latch balls 56 in the recess 54. In the preferred embodiment such means includes an axially movable tapered ring 58 housed within the cavity 50, the ring 58 defining a camming surface 60 for engaging the balls 56 and forcing them into the openings 52 and the recess 54. In this regard, the tapered ring 58 is biased toward the latch balls 56 by a spring member 62 to provide the necessary load to the balls 56, forcing them into the recess 54 with a magnitude defined by the geometry and biasing force of the spring member. However, the application of disengaging force, or pull, on the valve housings 18 and 20 causes a resolution of the axial disengaging force to the balls 56 via the sloping sidewall 64 of the recess 54. The load transmitted to the balls is transmitted to the tapered ring 58 and, in turn, to the spring member 62 which yields proportional to the loading. As the spring member 62 yields, it permits the tapered ring 58 to move axially, providing increased radial freedom for the balls 56 which ride up the sloping sidewall 64 until they no longer extend into the recess 54. Thus, the balls 56 no longer serve to retain the housing 18 within the receptor 22, thereby allowing the housing 18 to disengage from the housing 20. Of course, as discussed above, as the valve housing 18 disengages and the housings 18 and 20 separate, the poppet valves 30 and 32 serve to seal their respective passageways 26.

It will be recognized by those skilled in the art that the axial disengaging force necessary to disengage the housing 18 from the receptor 22 can be preselected through the use of a spring member 62 which provides a preselected biasing force (and through preselection of the angle of the sloping sidewall 64). Thus, when the device 10 is used to connect fuel supply hoses associated with a fuel dispensing pump, a spring member 62 can be selected which maintains the engaged position of the valve housings during normal operation, but allows disengagement when disengaging force sufficient to damage the supply pump is exerted on the coupling. It will also be noted that in the preferred embodiment, forward portion 24 of the housing 18 is provided with a sidewall 25 defining a shallow taper. The tapered sidewall 25 serves as a camming surface for forcing the balls 56 into the cavity 50 as the housing 18 is inserted into the receptor 22, thereby decreasing the engaging force necessary to accomplish the coupling of the housings 18 and 20.

The swivel mechanism of the coupling 10 is illustrated generally at 66 in FIG. 1. The mechanism 66 includes a swivel housing or elbow 68 having a passageway 70 therethrough defining a first port 72 for communicating with the passageway 26 of the housing 18 and a second port 74 for being placed in fluid communication with a dispensing device. More specifically, the elbow 68 has a first end portion 76 which is rotatably received in an annular receptor 78 provided in the valve housing 20, thereby placing the passageways 26 and 70 in fluid communication. It will be noted that the first end portion 76 of the elbow and receptor 78 are aligned on a axis which is at a preselected angle relative to the primary axis on which the receptor 28 of the housing 20, and the poppet valves 30 and 32, are oriented. Accordingly, when the first end portion 76 of the elbow is rotated in the receptor 78 the elbow 68 swivels about a secondary axis 79 inclined with respect to such primary axis.

In the illustrated embodiment of FIG. 1, this secondary axis 79 is aligned at approximately a seventy degree angle to the primary axis, but this angle may vary. For example, in FIG. 1A the secondary axis 79 is orientated at approximately a 45 degree angle to the primary axis. This decrease in the relative angle of the secondary axis 79 allows 360 degrees rotation of the elbow 68 with respect to the housing 20 without having to lengthen the first end portion 76 of the elbow 68 to provide clearance between the elbow 68 and housing 20.

The swivel mechanism 66 also includes means for rotatably locking the first end portion 76 of the elbow in the receptor 78. In the preferred embodiment, the first end portion 76 and the receptor 78 are provided with the registering annular grooves 80 and 82, respectively, which cooperatively define an annular channel circumscribing the first end portion 76. Further, as best illustrated in FIG. 2, the housing 18 defines a further channel 84. Into the channel 84 and the channel formed by the grooves 80 and 82 is inserted a flexible rod 86 having a substantially circular cross-section. Preferably the rod 86 is fabricated of nylon or other strong, durable resilient material. Thus, as will be recognized by those skilled in the art, when seated in the grooves 80 and 82 the rod 86 prohibits the first end portion 76 from being removed from the receptor 78, and also serves as a bearing to facilitate the rotational engagement of the elbow 68 and valve housing 20. Of course, the above described locking means represents only one suitable means for rotatably locking the first end portion 76 in the receptor 78, and other suitable means can be used if desired.

The swivel mechanism 66 also includes means for rotatably connecting the elbow 68 to a hose, nozzle, pump, or other dispensing device, such that the passageway 70 is in fluid communication with such device. In the preferred illustrated embodiment such means includes a connecting member 88 having a first end portion 89 for being rotatably received in a receptor 90 defined in the elbow 68 and having a threaded portion 92 for releasable engaging a dispensing device. Further, a passageway 94 is provided through the connecting member 88 to establish fluid communication between the elbow and dispensing device. In this preferred embodiment the connecting member 88 is locked into the receptor 90 with a flexible rod 96 as described above with respect to the locking of the first end portion 76 of the elbow in the receptor 78. Thus, axial rotation of the coupling 10 with respect to the dispensing device is accommodated, with the associated rotational axis being inclined with respect to the secondary axis 79 about which the first end portion 76 of the elbow 68 rotates.

It should be noted that the connecting member 88 can be integral with the dispensing device if desired or comprise a separate component which is mounted on the inlet port of a conventional nozzle, hose, or other dispensing device.

The device 10 is also is provided with means for prohibiting rotation of the housing 18 with respect to the valve housing 20. In this regard, given the rotational engagement of the elbow 68 with the valve housing 20 and the rotational engagement of the connecting member 88 with the elbow 68, it is not necessary to provide for rotation of the housing 18 with respect to the housing 20. Moreover, such rotation can undermine the seal between the housing 18 and the walls of the receptor 22 and otherwise disrupt the functioning of the disconnect means 16.

Of Course, it will be appreciated that various means can be used to prohibit rotation of the housing 18 with respect to the housing 20. However, in the preferred illustrated embodiment the housing 18 defines a rearward end portion 98 defining a hexagonal configuration for being received by a wrench in order to facilitate the mounting of the housing 18 on a hose or other dispensing device. (See FIGS. 3, 4 and 5). Further, the outer sleeve 48 is provided with at least one protruding member 100, there being two such protruding members provided in the illustrated embodiment. Each protruding portion 100 has an engaging surface 102 which is disposed so as to engage or be proximate one or more of the flat surfaces 104 of the rearward end portion 98 as the housing 18 is positioned in the receptor 22. Accordingly, upon any rotational force being applied to the housing 18 the flat surfaces 104 will encounter the protruding members 100 and rotation will be prohibited.

In FIG. 6, an alternate embodiment of the coupling of the present invention is illustrated at 10'. Components of the coupling 10' which are common to the coupling 10 described above are referenced by common prime numbers. The coupling 10' is provided with an alternative disconnect means for disconnecting the housings 18' and 20' when disengaging force in excess of a preselected value is applied to the coupling. In this embodiment an annular groove 106 is provided in the receptor 22', and a registering annular groove 108 is provided in the housing 18', so as to circumscribe the housing 18'. A circular canted-coil spring 110 is mounted in the registering grooves 106 and 108, and serves to releasably hold the housing 20' in the receptor 22' during normal operation. (See FIG. 7) However, when disengaging force in excess of a preselected value is applied to the coupling 10' the force applied to the spring 110 by the housings 18' and 20' as they seek to disengage causes the spring 110 to compress into one of the grooves 106 or 108, thus allowing the housings to disconnect. Of course, the force necessary to effect disengagement can be preselected by selecting the appropriate canted-coil spring 110. Further, the disengagement force required can also be manipulated by providing the registering grooves 106 and 108 with sloping or tapered sidewalls as is discussed with respect to the sloping sidewall 64 of the recess 54. (See FIG. 1).

It will be noted that in the illustrated embodiment of FIG. 6 the protruding members 100' are carried by the valve housing 20' since no outer sleeve 48 is utilized. Further, it will be understood that the protruding portions 100' need not be integral with the housing 20' as depicted in FIG. 6, and it is contemplated that the protruding members 100' can be removably mounted on the housing 20' if desired.

In light of the above, is will be appreciated that the present invention provides an improved breakaway hose coupling with great advantages over the prior art. The invention provides a coupling which automatically disengages and seals the hose ends or dispensing device conduit to which it is secured in response to disengaging force in excess of a preselected value, while also incorporating a swivel mechanism which allows rotation on two different rotational axes. Further, the swivel mechanism provides for rotation at a point displaced from the disconnect mechanism and the associated poppet valves such that the functioning of such mechanism is not disrupted.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A breakaway hose coupling device with integrated swivel mechanism for releasably joining two fuel dispensing devices in fluid communications, and for selectively disengaging said dispensing devices in response to a disengaging force in excess of a preselected value being exerted on said coupling device, said coupling device comprising:

a first valve assembly for being secured on, and being placed in flow-through fluid communication with, a first said dispensing device and for selectively terminating the flow of fuel from said first dispensing device, said first valve assembly including a first valve housing having a first valve means mounted therein for selectively terminating the flow of fuel through said first valve assembly, said first valve means being aligned on a first axis;

a second valve assembly for being secured on, and placed in flow-through fluid communication with, a second said dispensing device and for selectively terminating the flow of fuel from said second dispensing device, said second valve assembly including a second valve housing and a elbow, and having swivel connecting means for pivotally securing said elbow to said second valve housing, whereby said elbow selectively swivels with respect to said second valve housing on a second axis inclined with respect to said first axis, said second valve assembly also including a second valve means disposed in said second valve housing at a location remote from said swivel connecting means for selectively terminating the flow of fuel through said second valve assembly;

automatic disconnect means for maintaining said first and second valve housings in an engaged position in absence of said disengaging force in excess of a preselected value, and for disengaging said first and second valve housings in response to said disengaging force n excess of said preselected value, whereby said first and second valve means terminate the flow of fuel through said first and second valve assemblies, respectively upon the disengaging of said first and second valve housings; and means for prohibiting rotation of said first valve housing with respect to said second valve housing as said first valve housing engages said second valve housing while allowing unobstructed axial movement of said first valve housing with respect to said second valve housing in order to allow uninterrupted operation of said automatic disconnect means.

2. The breakaway hose coupling of claim 1 wherein said first valve housing is provided with a first passageway therethrough defining a first port for being placed in fluid communication with said first dispensing device, and a second port for being placed in fluid communication with said second housing, said second housing being provided with a second passageway therethrough defining a first port for being placed in fluid communication with said second port of said first valve housing and defining a second port for being placed in fluid communication with said elbow, and wherein said elbow is provided with a third passageway therethrough defining a first port for being placed in fluid communication with said second port of said second valve housing and defining a second port for being placed in fluid communication with said second dispensing device, said first port of said elbow being disposed in a first plane and said second port of said elbow being disposed in a second plane inclined with respect to said first plane.

3. The breakaway hose coupling device of claim 2 wherein said first valve housing is provided with a first annular connecting means circumscribing said first port for releasably engaging said first dispensing device, said first connecting means being axially aligned on said first axis, and wherein said elbow swivels with respect to said second valve housing about a second axis substantially perpendicular to said first preselected axis.

4. The breakaway hose coupling of claim 3 wherein said first annular connecting means includes a threaded receptor provided in said first valve housing.

5. The breakaway hose coupling of claim 2 wherein said swivel connecting means includes an annular connecting member carried by said elbow, and said second valve housing is provided with an annular receptor for rotatably receiving said annular connecting member of said elbow.

6. The breakaway hose coupling of claim 5 wherein said connecting member of said elbow defines an outer surface provided with a first annular groove and said annular receptor of said second valve housing defines a second annular groove for registering with said first annular groove of said elbow as said annular connecting member is received in said annular receptor of said second valve housing, whereby said first and second annular grooves cooperatively define a first annular channel, said second valve housing defining a second annular channel communicating with said first annular channel for providing access thereto, and wherein said swivel connecting means further comprises a flexible rod for being closely received through said second annular channel and into said first annular channel whereby said annular connecting member of said elbow is rotatably locked in said annular receptor of said second valve housing.

7. The breakaway hose coupling of claim 1 wherein said elbow is provided with further connecting means for rotatably engaging said second dispensing device on a rotational axis inclined with respect to said second axis.

8. The breakaway hose coupling of claim 1 wherein said automatic disconnect means includes an outer sleeve circumscribing said second valve housing and wherein said means for prohibiting the rotation of said first valve housing with respect to said second valve housing includes at least one protruding member carried by said outer sleeve, said protruding member defining an engaging surface for engaging at least one planar surface defined by said first valve housing so as to prohibit rotation of said first valve housing with respect to said second valve housing.

9. The breakaway hose coupling of claim 1 wherein said means for prohibiting the rotation of said first valve housing with respect to said second valve housing includes at least one protruding member carried by said second valve housing, said protruding member defining an engaging surface for engaging at least one planar surface defined by said first valve housing so as to prohibit rotation of said first valve housing with respect to said second valve housing.

10. A breakaway hose coupling device with integrated swivel mechanism for releasably joining two fuel dispensing devices in fluid communications, and for selectively disengaging said dispensing devices in response to a disengaging force in excess of a preselected value being exerted on said coupling device, said coupling device comprising:

a first valve assembly for being secured on, and being placed in flow-through fluid communication with, a first said dispensing device and for selectively terminating the flow of fuel from said first dispensing device, aid first valve assembly including a first valve housing having a forward end portion, said first valve housing being provided with an annular groove circumscribing said first valve housing, said first valve assembly also including a first valve means mounted therein and aligned on a first axis for selectively terminating the flow of fuel through said first valve assembly;

a second valve assembly for being secured on, and placed in flow-through fluid communication with, a second said dispensing device and for selectively terminating the flow of fuel from said second dispensing device, said second valve assembly including a second valve housing provided with a first annular receptor for closely receiving said forward end portion of said first valve housing, said second valve housing including a latch cavity circumscribing said second valve house, said second valve housing defining a plurality of latch ball opening for registering with said annular groove of said first valve housing, said second valve assembly further including an elbow, and having swivel connecting means for pivotally securing said elbow to said second valve housing, whereby said elbow selectively swivels with respect to said second valve housing about a second axis inclined with respect to said first axis, said elbow being provided with further connecting means for rotatably connecting said elbow in fluid communication with said second dispensing device such that said elbow rotates with respect to said second dispensing device about a third axis inclined with respect to said second axis, said second valve assembly also including a second valve means disposed in said second valve housing at a location remote from said swivel connecting means for selectively terminating the flow of fuel through said second valve assembly;

means for prohibiting the rotation of said first valve housing with respect to said second valve housing, said means including at least one protruding member carried by said outer sleeve and defining at least one planar engaging surface for engaging at least one planar surface defined by said first valve housing to prohibit rotation of said first valve housing with respect to said second valve housing as said first valve housing is received in said annular receptor of said second valve housing while allowing uninterrupted axial movement of said first valve housing with respect to said second valve housing; and ball latch means housed within said latch cavity for securing said first valve housing within said first receptor of said second valve housing in absence of said disengaging force in excess of said preselected value, said ball latch means including a plurality of latch balls for being selectively received through said latch ball openings and into said annular groove provided in said first valve housing, said ball latch means further including locking means for releasably locking said latch balls in a position whereby at least a portion of said balls extend into said annular groove of said first valve housing in absence of said disengaging force in excess of said preselected value, said locking means including a tapered ring housed within said latch cavity, said tapered ring defining a camming surface for engaging said latch balls and biasing said balls into said annular groove of said first valve housing, said locking means further including spring means housed within said latch cavity for biasing said tapered ring into engagement with said latch balls.

11. The breakaway hose coupling device of claim 10 wherein said first valve housing defines a rearward end portion defining a hexagonal configuration defining six said planar surfaces, and wherein said outer sleeve carries a pair of said protruding members for engaging two said planar surfaces and prohibiting rotation of said first valve housing with respect to said second valve housing.

12. The breakaway hose coupling of claim 10 wherein said elbow is provided with an annular receptor, and wherein said further connecting means includes a connecting member having a first end potion for being rotatably received in said annular receptor of said elbow and a second end portion for engaging said second dispensing device.

13. A breakaway hose coupling device with integrated swivel mechanism for releasably joining two fuel dispensing devices in fluid communications, and for selectively disengaging said dispensing devices in response to a disengaging force in excess of a preselected value being exerted on said coupling device, said coupling device comprising:

a first valve assembly for being secured on, and being placed in flow-through fluid communication with, a first said dispensing device and for selectively terminating the flow of fuel from said first dispensing device, said first valve assembly including a first valve housing having a forward end portion, said first valve housing being provided with an annular groove circumscribing said first valve housing, said first valve assembly also including a first valve means mounted therein and aligned on a first axis for selectively terminating the flow of fuel through said first valve assembly;

a second valve assembly for being secured on, and placed in flow-through fluid communication with, a second said dispensing device and for selectively terminating the flow of fuel from said second dispensing device, said second valve assembly including a second valve housing provided with a first annular receptor for closely receiving said forward end portion of said first valve housing, said annular receptor defining a further annular groove for registering with said annular groove of said first valve housing as said first said valve housing is received in said annular receptor, said second valve assembly further including an elbow, and having swivel connecting means for pivotally securing said elbow to said second valve housing, whereby said elbow selectively swivels with respect to said second valve housing about a second rotational axis inclined with respect to said first axis, said elbow being provided with further connecting means for rotatably connecting said elbow in fluid communication with said second dispensing device such that said elbow rotates with respect to said second dispensing device about a third axis inclined with respect to said second axis, said second valve assembly also including a second valve means disposed in said second valve housing at a location remote form said swivel connecting means for selectively terminating the flow of fuel through said second valve assembly;

means for prohibiting the rotation of said first valve housing with respect to said second valve housing, said means including at least one protruding member carried by said second valve housing and defining at least one planar engaging surface for engaging at least one planar surface defined by said first valve housing to prohibit rotation of said first valve housing with respect to said second valve housing as said first valve housing is received in said annular receptor of said second valve housing while allowing uninterrupted axial movement of said first valve housing with respect to said second valve housing; and a canted-coil spring member, a portion of which is received in said annular groove of said first valve housing and a portion of which is received in said further annular groove of said second valve housing for securing said first valve housing within said annular receptor of said second valve housing in absence of said disengaging force in excess of said preselected value, whereby said disengaging force in excess of said preselected value compresses said spring member such that said spring member no longer protrudes into both said annular groove and said further annular groove, allowing said first valve housing to disengage from said receptor of said second valve housing.

14. The breakaway hose coupling device of claim 13 wherein said first valve housing defines a rearward end portion defining a hexagonal configuration defining six said planar surfaces, and wherein said second valve housing carries a pair of said protruding members for engaging two said planar surfaces and prohibiting rotation of said first valve housing with respect to said second valve housing.

15. The breakaway hose coupling of claim 11 wherein said forward end portion of said first valve housing defines a tapered sidewall for facilitating the insertion of said first valve housing into said first receptor of said second valve housing.

16. The breakaway hose coupling of claim 11 wherein said second axis is orientated at approximately a 45 degree angle relative to said first axis.

17. The breakaway hose coupling of claim 13 wherein said forward end portion of said first valve housing defines a tapered sidewall for facilitating the insertion of said first valve housing into said first receptor of said second valve housing.

18. The breakaway hose coupling of claim 13 wherein said second axis is orientated at approximately a 45 degree angle relative to said first axis.

19. The breakaway hose coupling of claim 13 wherein said elbow is provided with an annular receptor, and wherein said further connecting means includes a connecting member having a first end portion for being rotatably received in said annular receptor of said elbow and a second end portion for engaging said second dispensing device.

* * * * *